(No Model.)
E. S. BOYNTON.
GALVANIC BATTERY.
No. 557,356. Patented Mar. 31, 1896.
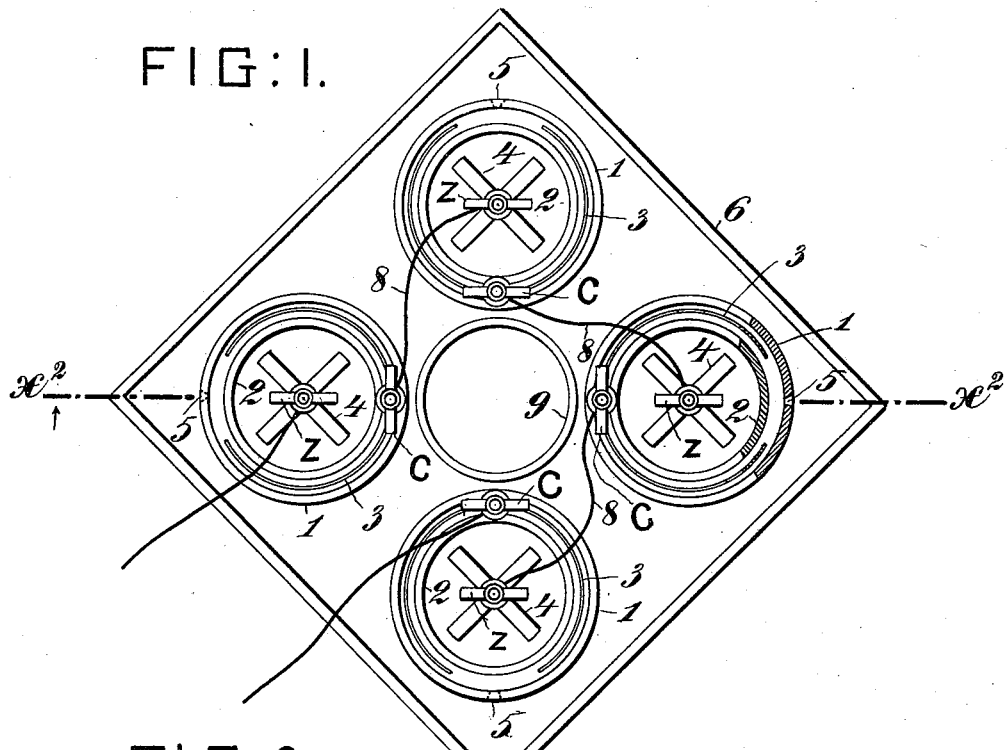
FIG: 1.
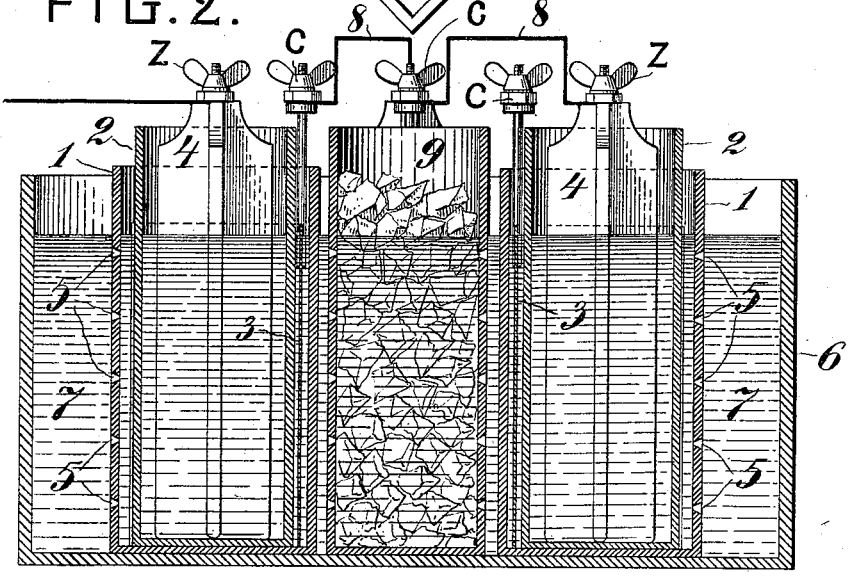
FIG: 2.
WITNESSES:
INVENTOR:
Edward S. Boynton
By Henry Connett
Attorney.

UNITED STATES PATENT OFFICE.

EDWARD S. BOYNTON, OF BROOKLYN, NEW YORK.

GALVANIC BATTERY.

SPECIFICATION forming part of Letters Patent No. 557,356, dated March 31, 1896.

Application filed September 13, 1895. Serial No. 562,366. (No model.)

*To all whom it may concern:*

Be it known that I, EDWARD S. BOYNTON, a citizen of the United States, residing at Brooklyn, in the county of Kings and State of New York, have invented certain new and useful Improvements in Galvanic Batteries, of which the following is a specification.

My invention relates to the class of double-fluid batteries, and the object is to effect a convenience in the use of the battery by a certain construction of the cells of the same in such a manner that the latter may be grouped in one outer vessel or reservoir containing the outer liquid electrolyte.

The accompanying drawings illustrate an embodiment of the invention in a sulfate-of-copper battery, Figure 1 being a plan of a battery comprising four cells, and Fig. 2 a vertical section of the same in the plane indicated by line $x^2\ x^2$ in Fig. 1.

Each cell of the battery comprises the following parts: First there is an outer cup 1, which will be of some material which is impervious to the battery-fluids and which will resist the chemical action in the cell, as hard rubber, glass, &c. Inside of this cup 1 is set a porous cup 2, of the kind commonly employed in this class of cells. In the outer cup 1 is in this instance the copper electrode 3, provided with a suitable clamp C for the connecting-wire, and inside the porous cup 2 is the zinc electrode 4, provided with a suitable clamp Z for the connecting-wire.

In the outer cup 1, at one side only, are small apertures 5, placed at different levels. Part of the cell at the right in Fig. 1 is broken away down to one of said apertures in order to show the latter in full lines in this view. The copper electrode 3 is in the form of a sheet rolled into a tubular form and arranged with the slit or opening between its edges situated opposite to the row of holes or apertures 5 in the cup 1, as clearly shown in Fig. 1.

What is described above constitutes a single voltaic cell, and in forming the battery a number of these cells are set in a receptacle or reservoir 6, and this reservoir is filled up to the proper level with an aqueous solution of sulfate of copper 7, Fig. 2, the porous cups 2 being, at starting, filled with an aqueous solution of sulfate of zinc and the cells connected in series by conductors 8.

To keep the battery replenished with the copper-salt, a vessel or cup 9, with apertures in its sides, may be set in the reservoir 6 and filled with crystals of sulfate of copper.

A battery constructed and arranged as above described will yield a voltage nearly corresponding to the number of cells and an amperage corresponding to the size of the cells, as in any Daniell's battery having separate cells and separate copper solutions, one for each cell.

My battery has the advantage that all of the cells are immersed in a copper solution common to all, and they are all in one large vessel or reservoir, so as to be much more conveniently handled and much more conveniently taken care of than where they are separate.

In placing the cells in the vessel 6 it is important to so set them that the rows of apertures 5 in the several outer cups 1 shall not be near together in any two cells. Therefore I prefer to place the cells, as seen in the drawings, with the side of the cup where said apertures 5 are situated facing outward. A series of small holes 5, placed in a vertical row, is preferred to a narrow slit, for the reason that they do not weaken the wall of the cup so much as a slit.

I have represented the cups 1 and 2 as circular in plan and the reservoir or vessel 6 as square; but these forms are not at all material.

The primary filling of the porous cup 2 with a solution of sulfate of zinc is not necessary except when it is desired to use the battery at once.

The function of the cup 1 is to cut off electrical communication between the elements by interposing an insulator, and at the same time to admit the supply to all of the elements of the copper solution in proper quantity.

I may say that while it is customary in a sulfate-of-copper battery to arrange the two solutions as hereinabove described—that is, the copper solution exterior to the zinc solution—this arrangement may of course be reversed without departing from my invention.

Having thus described my invention, I claim—

1. In a battery having an outer containing-receptacle, a series of elements containing each a positive and negative electrode arranged in groups in operative relation to a common electrolyte, in said receptacle, the outer containing-jars of each element being provided with a series of vertically-arranged holes or passages, to afford eduction and induction ports at different levels for a circulation of the common electrolyte, substantially as and for the purpose described.

2. In a battery having an outer containing-receptacle, the combination with a series of elements containing each a positive and negative electrode arranged in groups in operative relation to a common electrolyte, the walls of the outer containing-jars of each element being provided with a series of vertically-arranged holes or passages to afford eduction and induction ports at different levels for a circulation of the common electrolyte, of a centrally-located jar that is adapted to hold in suspension at different levels soluble salts, said jar being provided with a series of vertically-arranged holes or passages as and for the purpose set forth.

In witness whereof I have hereunto signed my name in the presence of two subscribing witnesses.

EDWARD S. BOYNTON.

Witnesses:
HENRY CONNETT,
PETER A. ROSS.